Oct. 11, 1938.    B. M. BODDE    2,133,076
TRANSLUCENT PROJECTION SCREEN
Original Filed Nov. 22, 1935

INVENTOR.
BERNARD M. BODDE
BY W. E. Beatty
ATTORNEY.

Patented Oct. 11, 1938

2,133,076

UNITED STATES PATENT OFFICE 2,133,076

TRANSLUCENT PROJECTION SCREEN

Bernard M. Bodde, Hollywood, Calif.

Original application November 22, 1935, Serial No. 51,129. Divided and this application June 15, 1936, Serial No. 85,275

7 Claims. (Cl. 88—24)

This invention relates to picture projection screens and particularly to the translucent type of screens in which pictures projected on one side of the screen may be viewed or photographed on the opposite side.

This is a divisional application of application Serial No. 51,129, filed November 22, 1935, for "Manufacture of truslucent screens", which application discloses and claims the method of making screens as disclosed herein.

One of the difficulties encountered in the projection of pictures upon a screen is that the picture has a much higher value of light intensity at its center than at the edges, that is, the light source forms a comparatively bright spot at the center of the screen, commonly called a "hot spot", which gradually tapers off toward the edges of the screen. This inherent difficulty is not so noticeable in reflection screens as it is in translucent screens. However, when a composite picture is produced by photographing a picture which is projected upon a translucent projection screen, the projection of the resulting composite picture upon a reflection type screen may show a very marked apparent "hot spot".

Whether a translucent picture screen is to be employed for the photographing of composite pictures or for the projection of pictures to be viewed by an audience, it is desirable that the screen transmit as large an amount of light as possible while still retaining its translucency.

One object of the present invention is to obtain good tone qualities and a high degree of intensity of a picture transmitted by a translucent screen.

This is accomplished by employing a screen having a transparent base in sheet form with an array of minute light refracting particles provided upon the surface of the base. These refracting particles are of a transparent crystalline material of high light refractive qualities. I employ for this purpose finely ground or fractured quartz which will pass through at least a 400 mesh screen and preferably through a 2000 mesh screen. The use of a transparent base having a transparent light refracting material applied thereto allows for the highest possible light intensity to be transmitted by the screen. The small size to which the quartz particles are ground prevents an apparent graininess from being photographed or observed on the screen and increases the detail or tonal qualities of a projected picture.

Another object of the invention is to overcome the "hot spot" while obtaining a degree of light transmission through the translucent screen.

This is accomplished by so applying the minute light refracting particles to the transparent base of the screen that there are a larger number per unit of area in portions of the screen where the intensity of the light projected thereon is high. Thus the more intense portions of the light beam will be refracted a greater number of times than the less intense portions resulting in a transmitted light whose intensity is substantially constant over its entire cross sectional area.

As disclosed and claimed in said other divisional application, I reduce the possibility of water vapor, dirt, etc., getting into the transparent base in the course of spraying the same.

This is accomplished by arranging the matrix on which the base is sprayed in a substantially horizontal position, the transparent cellulose material being sprayed thereon from underneath. Any dirt or water vapor from the spray equipment or elsewhere will tend to settle downward away from the surface of the sprayed cellulose. Furthermore, positioning the matrix so as to allow the transparent material to be sprayed on the bottom side thereof allows sheets of any size to be produced without the necessity of overhead scaffolding and ladders from which dirt might fall onto the screen if it were sprayed on the top of the matrix.

Also, as disclosed and claimed in said divisional application, I insure correct distribution of the light refracting particles over the base of a translucent screen to compensate for the variations in intensity throughout the cross sectional area of a light beam projected on the screen.

This is accomplished by projecting upon the base of the screen during the operation of applying upon it the light refracting particles, a beam of light whose intensity varies throughout its cross sectional area. The density of distribution of the light refracting particles is then varied across the surface of the screen in accordance with the intensity of the light beam projected upon the screen so as to render a transmitted light of equal intensity throughout the area of the screen.

As disclosed and claimed in said divisional application, I prepare a spraying material for forming a translucent screen by grinding quartz into small particles, mixing these particles with a cellulose material dissolved in a thinner to render it in liquid form, and again grinding this mixture until the quartz is of extremely small size, i. e. preferably of 2000 to 3000 mesh. The resulting material may again be mixed with a cellulose material in liquid form and sprayed upon a transparent base to form a translucent screen.

A further object of the invention is to prevent back glare or reflection of light from the surface of a translucent screen base opposite the surface which is treated with light refracting material to render the base translucent.

This is accomplished by providing a screen having on the untreated surface of the translucent screen base thereof, a coating of stearate compound, such as zinc stearate.

For further details of the invention, reference is to be had to the accompanying drawing, in which.

Figure 1:
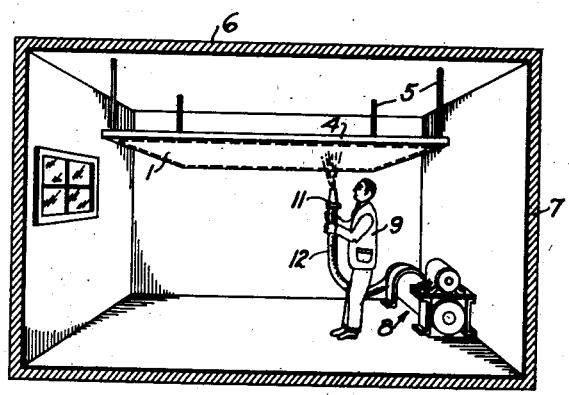
Fig. 1 is a perspective view showing the method of making a transparent base for a translucent screen.

In employing relatively large screens, that is, over 8 ft. in width and 10 ft. in length, it is necessary to provide a considerable amount of tension between the edges of the screen and a frame therefor in order to maintain the screen in a taut position. I provide a screen sufficiently strong enough to withstand this tension, without employing the use of such strengthening agents as wires or webbing in the body of the screen, by using a transparent base of cellulose material of a thickness to give sufficient strength and by providing on one surface (or both surfaces) a thin layer of translucent material. I thus gain the necessary strength of the screen without any substantial reduction of transmitted light caused by strengthening wires, webbing or screens heretofore usually provided in the body of the screen. Furthermore, I obtain the desired translucency of the screen substantially independently of the consideration of strength of the screen.

The matrix 1 (Figs. 1 and 2) is formed of a fabric 2 having a base 3 thereon to present a smooth surface on the lower face thereof. Base 3 is formed of a suitable material such as an amber composition which is not compatible with the liquid employed in making the transparent base for the screen. The matrix 1 is secured to the bottom of a suitable frame 4 which is suspended as by wires 5 from the ceiling 6 of the spraying room 7.

Figure 2:
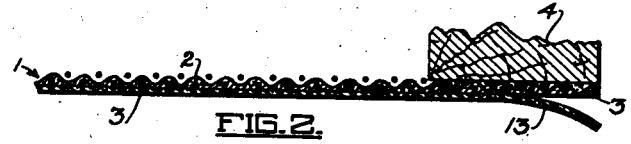
Fig. 2 is a sectional view through the matrix and the transparent screen formed thereon.
Figure 3:
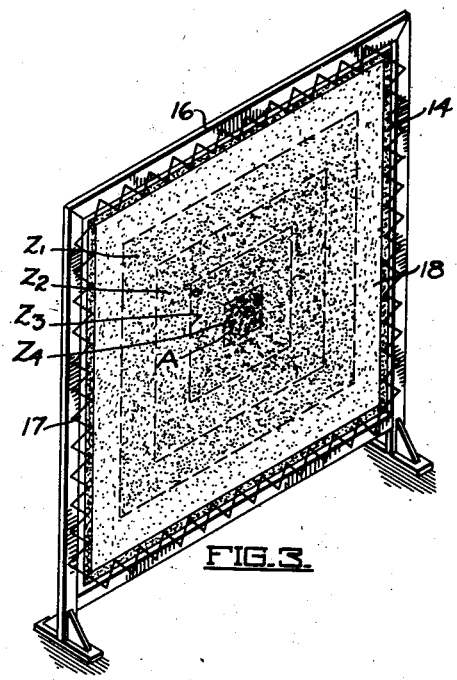
Fig. 3 is a perspective view showing the completed translucent screen suspended within a frame.
Figure 4:
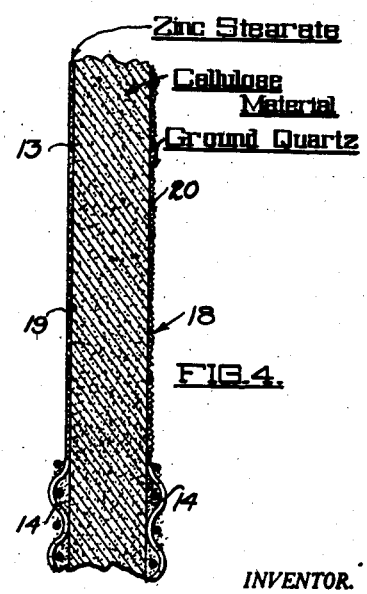
Fig. 4 is an enlarged fragmentary cross sectional view through the translucent screen.

The transparent sheet material such as cellulose acetate or cellulose nitrate, which is to be employed in producing the base for the translucent screen, is dissolved in suitable solvents, plasticizers, etc., to render it liquid and sprayable upon the matrix 1. The liquid cellulose material is sprayed under pressure upon the under surface of the matrix 1 in the manner shown in Fig. 1 through a suitable spraying apparatus as shown at 8. This spraying operation may be carried out manually by an operator 9 standing below the matrix 1. By directing the nozzle 11 of the liquid conveying hose 12 throughout the entire area of matrix 1 the transparent base 13 (Fig. 2) may be produced. Preferably the base 13 is formed by spraying a large number of cellulose coats upon the under surface of the matrix 1 and allowing each coat to dry before the application of the next succeeding coat. The completed flexible transparent sheet thus formed may be of any desired thickness; however, I prefer to make it from .015" to .030" thick. Also, sheet 13 is preferably of substantially the same thickness throughout its entire area or it may increase slightly in thickness towards the edges so as to increase the strength of these portions and/or make the thickness of the finished screen substantially the same throughout, the coating in the latter case obviously tapering from the center to the edges of the screen. However, it is to be understood that the change in thickness of the sheet 13 is not utilized to affect the intensity of the transmitted light. For example, in a screen 18 ft. long by 14 ft. wide the base 13 may be .025 inch thick at the center of the screen and gradually increase in thickness to .030 inch near the edges of the screen so as to obtain the additional strength desired near the edge portions. The layer 20 of translucent material, however, may be .003 inch thick at the center of the screen and gradually taper down to .001 inch at the edge of the screen due to the reduced number of translucent coatings near the edges. With the dimensions given above it will be apparent that the quartz layer 20 is about 5 per cent of the thickness of the body of the screen at the center thereof and about 3 per cent at the edges thereof. It will be seen therefor that although the total thickness of the screen may be uniform throughout the area of the screen or, in fact, less in the central portion, the degree of translucency may be more at the center than at the edges. After the sheet or base 13 is entirely dry, it is provided with a reinforcing web or strip 14 around its edges. The sheet 13 is then stripped from the matrix 1 and is suspended in a frame 16 (Fig. 3) as by interlaced elastic cords 17. For relatively large screens, for example 14 ft. by 18 ft., I provide a tension between the screen and its frame of about 30 lbs. per linear foot along the edge of the screen to maintain it in a taut position.

The light refracting material employed to render the sheet 13 translucent is formed of a crystalline material which is ground to an extremely fine mesh. Quartz is preferably employed because of its high light refractive qualities. However, silicon, feldspar and other similar materials may be used although they are not as efficient.

In one method of obtaining a very finely ground quartz material, pieces of crystal quartz weighing one pound or less are placed in a dry condition within a ball mill and there ground for a period of about one week, whereby the quartz is reduced to a fine powder. At the end of this time the iron and other impurities are removed from the ground quartz by a magnet, acid, etc. The resulting quartz powder is then mixed with a cellulose material in liquid form in the approximate proportions of five pounds of quartz to 1½ gallons of cellulose material dissolved in a suitable thinner to render it liquid. This mixture is then ground between rolls or otherwise for a period of about a week to further decrease the size of the quartz particles and to thoroughly mix these particles with the liquid cellulose material. The resulting quartz particles will be sufficiently fine to pass through a 2000 to 3000 mesh screen. This resulting mixture of cellulose and finely ground or fractured quartz is then further mixed with liquid cellulose material in the approximate proportions of 2 quarts of quartz mixture to 20 gallons of dissolved cellulose material and is placed in a spraying apparatus similar to that shown at 8 (Fig. 1). The final quartz and cellulose mixture is sprayed under air pressure upon the transparent base or sheet 13 in the form of a fine mist or spray. The thickness of the quartz and cellulose coating upon the transparent base 13 is extremely small, being slightly larger than the thickness of the quartz particles. The density of distribution of the quartz particles is made greater at the center of the screen as shown at A (Fig. 3) and gradually decreases toward the edges. This is accomplished by applying more coats of the quartz and liquid cellulose mixture at the center than at the edges. For example, in the coating of the quartz mixture upon a transparent base of about 16 ft. on each side, about 6 to 8 coats of quartz mixture may first be evenly applied over the entire area of the base, then about 4 or 5 coats may be applied over a smaller area or zone $Z_1$, next about 10 coats may be applied over a still smaller zone $Z_2$, next about 6 coats over a next smaller zone $Z_3$, and finally about 6 coats over a still smaller zone $Z_4$. This last zone $Z_4$ may cover an area of about 3 sq. ft. in the central portion of the screen. These coats, however, gradually blend together so as to form a single coat whose density of quartz distribution gradually increases toward the center of the screen. It is to be understood at this point that the thickness of the layer 20 of quartz particles remains substantially of the same thickness throughout the area of the translucent screen but that the density of distribution or the number of quartz particles per unit of area varies toward the center of the screen. The thickness of the layer of quartz particles is sufficiently small enough so as not to materially reduce the flexibility of the screen.

By rubbing the fingers over the quartz sprayed surface after the same has dried, the surface feels rough, somewhat like emery paper, although of much finer texture. This indicates that as the solution of liquid cellulose and minute quartz particles are sprayed upon the base, the liquid cellulose material adhering to the projecting points of the quartz particles tends to flow toward the cellulose base due to surface tension of the liquid cellulose. That is, the cellulose at the projecting points has an affinity for the cellulose base and thus tends to flow thereto. It will be seen therefore that the quartz particles become partially imbedded in the cellulose material with projecting light refracting points in direct contact with the air.

During the operation of spraying the ground quartz upon the transparent cellulose sheet 13, a suitable projector is employed to project a beam of light upon the back surface of the screen. The cross sectional area of this beam of light preferably varies in intensity there-across in the same proportions as the beam of light to be ultimately used to project pictures, etc., upon the screen. That is, the beam increases in intensity toward its center. The finely ground quartz is so sprayed upon the sheet 13 that the transmitted light from the projected beam of light passing through the sheet and the quartz layer is of substantially constant intensity over the entire area of the screen. The more intense portions of the projected beam of light are refracted through a larger number of paths than the less intense portions to decrease the intensity of illumination at these points.

Although the above description is directed toward the production of screens for maintaining an even intensity throughout the entire area of the resultant translucent screen 18, it is apparent the density of distribution of the quartz particles may be so varied throughout the area of the screen 18 as to produce other desired effects. Also, if desired, the quartz may be uniformly applied to the surface of the transparent base so that the density of distribution of the quartz grains or particles is the same throughout the entire area of the screen. In this case the "hot spot" may be overcome by other means such as by placing a light filter in the path of the light beam between the projector and the screen.

In order to prevent back glare or reflection from the rear of the sheet 13 due to the sheen or polished effect of the surface, a coating 19 of a stearate compound such as zinc stearate may be provided thereon to produce a slightly dull surface. Preferably the stearate compound is mixed in a liquid cellulose solution and is applied to the untreated surface of sheet 13 by spraying it in the form of a mist or spray upon this surface.

Having thus described the invention, what is claimed as new and desired to secure by Letters Patent is:

1. A translucent picture projection screen comprising, a sheet of substantially transparent material free from a light diffusing ingredient in the body thereof, and a number of minute irregular light refracting particles protruding from the exterior of said sheet and providing a rough surface, the density of distribution of said particles gradually increasing toward the center of said sheet.

2. A translucent screen adapted to receive a beam of light whose intensity increases toward the center of a cross sectional area of said beam comprising, a sheet of substantially transparent material free from a light diffusing ingredient in the body thereof, and an array of finely ground quartz particles protruding from the exterior of said sheet and providing a rough surface, the intensity of distribution of said particles increasing toward the center of said sheet.

3. A projection screen comprising a base of transparent cellulose material free from a light diffusing ingredient, said base being thinner at the center than at the edges thereof, and a coating of fine mesh crystalline material embodied in and protruding from cellulose material on the exterior of said base and providing a rough surface, said coating being thicker at the center of said screen than at the edges thereof.

4. A translucent projection screen comprising, a base of substantially transparent material free from a light diffusing ingredient in the body thereof, an array of minute light refracting particles protruding from said base, and a binder for said particles of the same material as said base.

5. A translucent projection screen comprising a base of cellulose ester material, an array of minute particles protruding from one side of said base for rendering the screen translucent, and a binder of cellulose ester material for binding said particles to said base.

6. A translucent projection screen according to claim 5 comprising a coating of light diffusing material on one surface of said screen.

7. A translucent projection screen comprising a substantially homogeneous transparent body portion of cellulose ester material, a light diffusing surface on one side of said screen, and a light refracting surface on the other side of said screen, said light refracting surface comprising multiple coatings of light refracting particles protruding from the surface of said screen, said coatings overlapping a number of times, which decreases as the distance from the center of said screen increases.

BERNARD M. BODDE.

DISCLAIMER 2,133,076.—*Bernard M. Bodde*, Hollywood, Calif. TRANSLUCENT PROJECTION SCREEN. Patent dated October 11, 1938. Disclaimer filed March 19, 1943, by the assignee, *Flat Light Screen Co*.

Hereby enters this disclaimer to claims 4, 5, and 6, in said specification.

[*Official Gazette April 20, 1943.*]